3,493,395
PROCESS FOR PREPARING A SAVORY MEAT FLAVORING
Cornelis Johannes Soeters, Rotterdam, Netherlands, assignor to Lever Brothers Company, New York, N.Y., a corporation of Maine
No Drawing. Filed Mar. 8, 1966, Ser. No. 532,594
Claims priority, application Great Britain, Mar. 10, 1965, 10,162/65
Int. Cl. A23l 1/26
U.S. Cl. 99—140                                                5 Claims

ABSTRACT OF THE DISCLOSURE

A process for preparing savory meat-flavored compositions in which a mixture of amino acid, a carbohydrate and fatty material is heated to 100°–140° C. until a savory meat flavor is developed, and the composition is substantially water free.

---

This invention relates to flavouring materials.

It is known that flavouring compositions capable of imparting a meat flavour to foodstuffs, or enhancing such flavour as the meat already has, can be prepared by heating an aqueous solution or suspension or slurry containing water and carbohydrate with decomposition products of protein, such as protein hydrolysate, which contain peptides and/or amino acids.

We have now found that an improved meat flavour may be obtained by heating a mixture containing an amino acid, or a compound releasing amino acid, with carbohydrate in the presence of an oil or fat at a temperature from 100° C. to 140° C. and under conditions such that at the end of the reaction the composition is substantially water-free.

By the method of the invention flavouring compositions are obtained containing two fractions, namely a water-soluble fraction and a fat-soluble fraction having different flavouring characteristics.

The water-soluble fraction is generally concentrated in the solid fat-insoluble decomposition products which often have a brown colour. Thus the water-soluble components may be easily removed by filtration of the fatty material. In general the water-soluble fraction has a pronounced taste but relatively little odour, whereas the fat-soluble fraction has a pronounced savoury odour but the taste is appreciably weaker than that of the water-soluble fraction.

The amino acid used according to the invention may be obtained by hydrolysis of proteins of animal or vegetable origin. Good results are obtained with acid- or enzyme-hydrolysed wheat gluten, soya protein and casein. Thus the origin of the protein is of little importance; however, the use of completely hydrolysed protein is preferred. To obtain particular types of flavour it may be preferable not to use protein hydrolysate as such, but hydrolysates having an enriched content of some of the amino acids. Thus a pork-like flavour is obtained when the amino acid consists of cysteine or is rich in cysteine, and the addition of up to 20% of cysteine to, say, a conventional wheat gluten hydrolysate gives a flavour strongly reminiscent of pork.

The carbohydrates used according to the invention are pentoses, hexoses, and di- and poly-saccharides derived from them. Invert sugar, saccharose and dextrose have been used; particularly favourable results have been obtained with dextrose.

The taste, odour and colour of the product are dependent, among other things, on the relative quantities of amino acid and carbohydrate used. Although these components may be used in widely varying proportions, excessive amounts of sugar may result in caramellization during the heating, causing undesirable flavours particularly in the water-soluble fraction; when an excess of amino acid is used the taste of the unreacted hydrolysate may dominate in the end product. Consequently it is preferred to use amino acid (or hydrolysate containing amino acid) and carbohydrate in weight ratios between 2:1 and 2:5, while optimal results are obtained when using weight ratios between 1:1 and 1:2.

The time during which the heating is continued depends on the reaction temperature. Generally, heating times varying between 1 and 20 minutes are sufficient, the shorter times being used at the higher reaction temperatures. Care should be taken that the heating treatment is not prolonged unnecessarily as this may cause certain flavouring components to escape or decompose.

In general almost any edible oil or fat may be used provided that it has a fairly neutral taste which is retained after the heat treatment. Consequently, highly unsaturated oils are less suitable. Tallow and lard, optionally hydrogenated, and vegetable oils, especially partly hydrogenated oils, are preferred.

The kind of fatty material used may be selected according to the type of flavour products required. Thus oils which are liquid at room temperature may be used for liquid products such as gravy concentrates, while solid fats are more suitable for solid products such as gravy tablets. When a product in powder form is desired, an absorbent may be added; for example toasted flour may be used and wheat flour has proved satisfactory. The powder may be pressed into the form of a cube in order to reduce deterioration of flavour.

From the flavouring composition thus obtained an excellent gravy substitute may be prepared by the addition of 15 to 20 volumes of hot water.

In a preferred embodiment of the invention further substances for example onion, may be added before the heating stage. By "onions" we mean Spanish onions, spring onions and other suitable members of the genus Allium, such as garlic and leek and products derived from them. An excellent gravy flavour concentrate may thus be obtained.

Further suitable substances that may be used alone or in combination with onion are tomato, carrot, celery, mustard and products derived from them. All these substances may be used in fresh, pickled or powdered form. Spices, for example bay leaves, monosodium glutamate and oil of citron may be added after the reaction products are cool. The product obtained by the addition of tomato and subsequent heating under comparable conditions is more suitable as a flavour for soups.

When onion as such is used it is convenient to suspend the finely divided substance in the fatty material. When onion products are used, it is preferable to ensure that at least part of the water-soluble components of onion are present in these products. An extract obtained by extracting onion with water and then drying is quite suitable. Less suitable are onion oil and several synthetic onion flavours which do not contain these water-soluble components.

It is probable that one or more of the water-soluble components present in onion react with amino acid and/or carbohydrate or their reaction products formed under the prevailing conditions.

Because onion extracts contain small amounts of carbohydrate a flavour obtained by heating in the presence of fat is formed as previously described, although the amount of carbohydrate is generally not sufficient to obtain good results and additional carbohydrate is preferred for optimal results.

It is desirable that at least a small amount of water is present with the starting materials. In practice, the starting materials usually contain a little water but much of this will escape by vaporization in the heating stage. Thus, the presence of a small amount of water during the reaction is beneficial, but substantially all of it should be removed by the end of the reaction. Suitably, therefore, the process is carried out under circumstances such that the water is removed quickly. The fatty material is therefore preferably heated to temperatures between 120° and 140° C. This may be followed by the addition of a mixture of other components.

In order to avoid the formation of a sediment which would stick to the bottom and the wall of the reaction vessel during the heating stage, additives such as lecithin and cooking salt may be added. As the reaction product obtained is usually a sticky, fatty mass it is preferred to add binding materials such as vegetable gum, for example guar gum, to the fatty material. It is also preferable to carry out the heating in a vessel equipped with a heating jacket instead of in a vessel containing heating coils in view of the sticky nature of the end products.

Water vapour evolved during the heating will protect the fatty material against oxidative reversion but further blanketing of the reaction mixture with nitrogen or carbon dioxide may result in an improved product.

The invention is illustrated by the following examples:

Example 1

Onion extract, tomato powder, dextrose, cysteine and a white powder-like protein hydrolysate as commercially available were added together with a small quantity of water, to salt and flour and mixed until a coarse-grained powder was obtained.

Hydrogenated groundnut oil (melting point 38° C.) containing a small amount of lecithin was heated to 140° C. Under continued heating and brisk stirring the mixture described above was added to the oil; this dosing was carried out at such a rate that the temperature was not allowed to drop below 120° C., while care was taken that the oil did not bubble over as a result of excessive steam development. After 10 minutes the temperature was raised to 130° C. and then the mass was allowed to cool to 40° C. under continued stirring. At a temperature of about 40° C. additional ingredients such as monosodium glutamate and spices were added and the liquid mixture was poured into moulds.

In such a way four types of gravy tablets were prepared from the following components (parts by weight):

|  | a | b | c | d |
|---|---|---|---|---|
| Onion extract | 0.92 | 0.79 |  |  |
| Dextrose | 0.88 | 0.75 | 1.05 | 1.15 |
| Cysteine-hydrochloride | 0.04 | 0.14 | 0.32 | 0.45 |
| Protein hydrolysate (approx. 25% amino acid) | 1.76 | 1.67 | 4.83 | 5.25 |
| Tomato powder |  |  | 3.25 |  |
| Cooking salt | 15.00 | 15.00 | 15.00 | 8.00 |
| Wheat flour | 11.00 | 11.00 | 11.00 |  |
| Water | 0.4 | 0.4 | 0.4 |  |
| Hydrogenated ground nut oil | 70.00 | 67.00 | 67.4 | 85.00 |
| Soda |  |  |  | 0.15 |

Example 2

The procedure of Example 1 was repeated using soya bean oil instead of hydrogenated groundnut oil, and the mixture was heated under a blanket of nitrogen. Liquid flavour concentrates were obtained.

Example 3

The following ingredients (parts by weight) were heated to a temperature of 130° C. during 1 to 2 minutes and cooled rapidly.

| | Parts |
|---|---|
| Groundnut oil | 91 |
| Caseine hydrolysate | 5 |
| Glucose | 3 |
| Water | 1 |

The resulting product had a pleasant savoury flavour.

Example 4

Example 3 was repeated using lard in place of groundnut oil.

Example 5

70 parts of hydrogenated soya bean oil were heated to 130° C. and the following ingredients were added in the form of a mixture (all parts by weight):

| | Parts |
|---|---|
| Onion | 0.92 |
| Glucose | 0.88 |
| Cysteine-hydrochloric acid | 0.04 |
| Protein hydrolysate | 1.76 |
| Cooking salt | 15 |
| Wheat flour | 11 |
| Water | 0.4 |

The mixture was kept under vigorous stirring at a temperature of 130° C. for two minutes, after which the mixture was allowed to cool.

10 g. of aroma-containing fat was mixed with 20 g. of toasted flour which contained a little fat and the mixture was pressed into tablets at a pressure of 1.2 kg./cm.$^2$. From the tablets a gravy could be prepared by dissolving them in a 10–20 fold quantity of water.

Example 6

Example 5 was repeated using lard in place of hydrogenated soya bean oil.

Example 7

Example 5 was repeated using tallow in place of soya bean oil.

What is claimed is:

1. A process for preparing savory meat flavor compositions which comprises preparing a mixture comprising:
   (a) an amino acid,
   (b) a carbohydrate selected from the group consisting of pentose and hexose monosaccharides and polysaccharides capable of being hydrolyzed to said monosaccharides, and
   (c) a fatty material selected from the group consisting of fatty acids and fatty acid triglycerides, and heating said mixture at a temperature of 100° C. to 140° C. for 1 to 20 minutes until a savory meat flavor is produced and the composition is substantially water free, the weight ratio of amino acid to carbohydrate in the mixture being from 2:1 to 2:5.

2. A process according to claim 1, in which the ratio is 1:1 to 1:2.

3. A process according to claim 1, in which the amino acid is cysteine.

4. A process according to claim 1, in which the carbohydrate is dextrose.

5. A process according to claim 1, in which a vegetable or vegetable product is added to the mixture before heating is completed.

References Cited

UNITED STATES PATENTS

| 2,934,437 | 4/1960 | Morton et al. | 99—140 |
| 3,365,306 | 1/1968 | Perret | 99—140 |

OTHER REFERENCES

Hornstein et al.: Journal of Agriculture and Food Chemistry, vol. 8, No. 6, 1960, pp. 494–498.

MAURICE W. GREENSTEIN, Primary Examiner

H. H. KLARE III, Assistant Examiner

U.S. Cl. X.R.

99—14, 17, 18, 124, 144